United States Patent
Park et al.

(10) Patent No.: US 11,111,323 B2
(45) Date of Patent: Sep. 7, 2021

(54) HOMOPOLYPROPYLENE RESIN FOR NON-WOVEN FABRIC AND METHOD FOR PREPARING THE SAME

(71) Applicant: LG Chem, Ltd., Seoul (KR)

(72) Inventors: Hee Kwang Park, Daejeon (KR); Byung Seok Kim, Daejeon (KR); Kyung Seop Noh, Daejeon (KR); Sang Jin Jeon, Daejeon (KR); Seong Min Chae, Daejeon (KR)

(73) Assignee: LG Chem, Ltd.

( * ) Notice: Subject to any disclaimer, the term of this patent is extended or adjusted under 35 U.S.C. 154(b) by 35 days.

(21) Appl. No.: 16/636,719

(22) PCT Filed: Nov. 8, 2018

(86) PCT No.: PCT/KR2018/013548
§ 371 (c)(1),
(2) Date: Feb. 5, 2020

(87) PCT Pub. No.: WO2019/093789
PCT Pub. Date: May 16, 2019

(65) Prior Publication Data
US 2020/0239609 A1 Jul. 30, 2020

(30) Foreign Application Priority Data

Nov. 8, 2017 (KR) .................. 10-2017-0148291
Nov. 7, 2018 (KR) .................. 10-2018-0136198

(51) Int. Cl.
*C08F 110/06* (2006.01)
*C08F 4/659* (2006.01)
*C08F 4/76* (2006.01)
*D04H 1/4291* (2012.01)
*C08F 2/02* (2006.01)
*C08F 4/6592* (2006.01)

(52) U.S. Cl.
CPC ......... *C08F 110/06* (2013.01); *D04H 1/4291* (2013.01); *C08F 2/02* (2013.01); *C08F 4/65927* (2013.01); *C08F 2420/01* (2013.01)

(58) Field of Classification Search
CPC ... C08F 110/06; C08F 4/65927; D04H 1/4291
See application file for complete search history.

(56) References Cited

U.S. PATENT DOCUMENTS

| | | | |
|---|---|---|---|
| 5,786,291 A | 7/1998 | Speca et al. | |
| 7,271,209 B2* | 9/2007 | Li | C08K 5/01 524/284 |
| 7,619,026 B2* | 11/2009 | Yang | C08L 23/0815 524/490 |
| 8,663,799 B2* | 3/2014 | Lin | D01F 6/46 428/364 |
| 8,664,129 B2* | 3/2014 | Dharmarajan | B32B 37/144 442/381 |
| 8,710,148 B2* | 4/2014 | Richeson | A61L 15/26 525/191 |
| 9,017,593 B2* | 4/2015 | Kolb | B32B 27/36 264/512 |
| 10,023,667 B2* | 7/2018 | Geeurickx | D01D 10/02 |
| 2005/0228155 A1 | 10/2005 | Kawai et al. | |
| 2006/0160967 A1 | 7/2006 | Voskoboynikov et al. | |
| 2006/0167295 A1 | 7/2006 | Damrau et al. | |
| 2007/0173162 A1* | 7/2007 | Ethiopia | D04H 3/16 442/327 |
| 2010/0029164 A1* | 2/2010 | Datta | D01F 6/46 442/414 |
| 2010/0190405 A1 | 7/2010 | Takebe et al. | |
| 2012/0123374 A1* | 5/2012 | Richeson | D01F 6/30 604/372 |
| 2012/0322961 A1 | 12/2012 | Rauscher et al. | |
| 2012/0329351 A1* | 12/2012 | Mehta | D04H 1/00 442/328 |
| 2016/0208028 A1 | 7/2016 | Choi et al. | |
| 2017/0051444 A1 | 2/2017 | Takebe et al. | |
| 2018/0105616 A1 | 4/2018 | Kim et al. | |
| 2019/0127503 A1 | 5/2019 | Joung et al. | |

FOREIGN PATENT DOCUMENTS

| | | | |
|---|---|---|---|
| EP | 1138687 A1 | 10/2001 | |
| JP | H06072352 B2 | 9/1994 | |
| JP | 1070729 A2 * | 1/2001 | ............. C08F 10/06 |
| JP | 2001123322 A | 5/2001 | |
| JP | 2002235237 A | 8/2002 | |
| JP | 2003028818 A | 1/2003 | |
| JP | 2006503911 A | 2/2006 | |
| JP | 2010144180 A | 7/2010 | |
| KR | 19990087170 A | 12/1999 | |
| KR | 20090130770 A | 12/2009 | |
| KR | 20150037652 A | 4/2015 | |
| KR | 20150046374 A | 4/2015 | |
| KR | 20150052804 A | 5/2015 | |
| KR | 101692346 B1 | 1/2017 | |
| KR | 20170023705 A | 3/2017 | |
| KR | 20170046461 A | 5/2017 | |
| KR | 20170059668 A | 5/2017 | |
| KR | 20170073463 A | 6/2017 | |
| WO | 2013176686 A1 | 11/2013 | |
| WO | 2017118617 A1 | 7/2017 | |

OTHER PUBLICATIONS

Report No. 4364 of the Naval Research Laboratories, published May 25, 1954 "Manufacture of Superfine Organic Fibers".

(Continued)

*Primary Examiner* — Rip A Lee
(74) *Attorney, Agent, or Firm* — Lerner, David, Littenberg, Krumholz & Mentlik, LLP

(57) ABSTRACT

The present invention relates to homopolypropylene resin for non-woven fabric, and according to the present invention, by optimizing tacticity to 80% to 90%, having narrow molecular weight distribution of 2.4 or less, and fulfilling melt index of 20 g/10 min to 30 g/10 min, melting point of 145° C. or less, and residual stress rate of 0.05% or less, thereby optimizing modulus, high strength non-woven fabric that is softer than the existing products, and is not easily torn due to high tenacity, can be prepared.

18 Claims, No Drawings

(56) References Cited

OTHER PUBLICATIONS

International Search Report for PCT/KR2018/013548 dated Mar. 8, 2019.
Extended European Search Report including Written Opinion for Application No. EP18876898.0, dated Jun. 23, 2020, pp. 1-9.

* cited by examiner

HOMOPOLYPROPYLENE RESIN FOR NON-WOVEN FABRIC AND METHOD FOR PREPARING THE SAME

CROSS-REFERENCE TO RELATED APPLICATIONS

The present application is a national phase entry under 35 U.S.C. § 371 of International Application No. PCT/KR2018/013548 filed Nov. 8, 2018, which claims priority from Korean Patent Application No. 2017-0148291 filed Nov. 8, 2017, and Korean Patent Application No. 2018-0136198 filed Nov. 7, 2018, all of which are incorporated herein by reference.

TECHNICAL FIELD

The present invention relates to homopolypropylene resin for non-woven fabric and a method for preparing the same.

BACKGROUND

In general, non-woven fabric includes fabric, felt, resin-bonded non-woven fabric, needle punch, spunbond, spunlace, emboss film, wet type non-woven fabric, and the like, which are made by bonding or entangling fiber assembly by mechanical operation or mechanical, chemical treatment such as thermal bonding without spinning and weaving, weaving, or knitting. As a specific meaning, it means bonding the contact point of randomly overlapped web and fiber with resin and using it as interlining. It is also named as bonded cloth, or bonded fabric. Such non-woven fabric may be prepared by various methods, and needle punching, chemical bonding, thermal bonding, melt bolwing, spunlace, stich bond, and spunbond methods are known.

Meanwhile, spunbond non-woven fabric using polyolefin resin as raw material has excellent feel, flexibility, air permeability, thermal insulation, and the like, and thus, is being widely used as filters, packaging materials, beddings, clothes, medical supplies, hygienic products, automobile interior materials, building materials, and the like. Particularly, polypropylene single fiber is processed into thermal-bonded non-woven fabric through calender bonding or air through bonding, due to the characteristic low melting point and excellent chemical resistance, and is mainly used as the surface material of hygienic products such as a diaper, a sanitary pad, and the like.

In Japanese Laid-Open Patent Publication No. 2002-235237, in order to afford softness and high tensile strength, a salicylic acid salt is introduced into masterbatch pellets as a crystallization inhibitor, thus seeking softness and high tensile strength through fine denier. However, it relates to spunbond non-woven fabric and is different from thermal-bonded non-woven fabric through single fiber in terms of its preparation method. It is generally accepted that spunbond non-woven fabric exhibits high tensile strength compared to thermal-bonded non-woven fabric, but soft feel is lowered.

Further, unlike the existing homopopypropylene resin prepared using a Ziegler-Natta catalyst, homopolypropylene resin prepared using a metallocene catalyst has narrow molecular weight distribution, and thus, thin and uniform fiber can be prepared, and thus, low basis weight non-woven fabric having excellent strength can be prepared. However, since metallocene homopolypropylene resin has small content of low molecular weights, due to low xylene soluble or narrow molecular weight distribution, it has a disadvantage of giving rough surface feel when preparing non-woven fabric.

Recently, softness could be improved by using polypropylene and polyethylene as resins, and preparing non-woven fabric with different resins inside and outside of fiber by Bi—Co spinning technology. However, it is not suitable for high strength non-woven fabric due to significant deterioration of strength. Further, there has been an attempt to blend elastic polymer, for example, C3 elastomer, with polypropylene resin, but in this case, although softness can be improved, production cost increases due to expensive resin, and it is difficult to apply in industrial processes.

DETAILED DESCRIPTION OF THE INVENTION

Technical Problem

It is an object of the present invention to provide homopolypropylene resin for non-woven fabric that gives softer feel than the existing products, when used in non-woven fabric, and can realize excellent tenacity without being easily torn due to high strength, by simultaneously optimizing tacticity, molecular weight distribution (MWD), melt index (MI), melting point (Tm), and residual stress rate, and having narrow molecular weight distribution, thereby optimizing modulus.

Technical Solution

According to one embodiment of the invention, polypropylene resin for non-woven fabric, which has tacticity of 80% to 90%, molecular weight distribution (MWD) of 2.4 or less, melt index (MI) of 20 g/10 min to 30 g/10 min, melting point (Tm) of 145° C. or less, residual stress rate of 0.05% or less, is provided.

The homopolypropylene resin for non-woven fabric may have molecular weight distribution (MWD) of 2.1 to 2.4, melting point (Tm) of 133° C. to 143° C., tacticity of 82% to 87%, and melt index (MI) of 23 g/10 min to 26 g/10 min.

And according to another embodiment of the invention, a method for preparing homopolypropylene resin for non-woven fabric is provided, which comprises a step of polymerizing propylene in the presence of a single catalyst comprising only a transition metal compound represented by the following Chemical Formula 1 as a catalytically active ingredient.

[Chemical Formula 1]

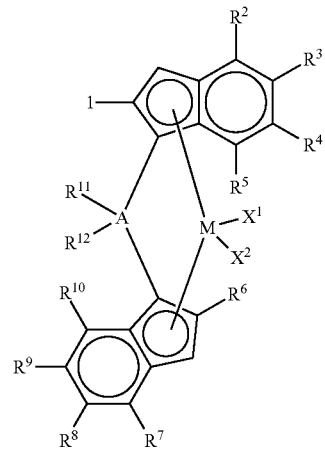

in the Chemical Formula 1,

A is carbon, silicon or germanium,

M is Group 4 transition metal;

$X^1$ and $X^2$ are identical to or different from each other, and are each independently, halogen, substituted or unsubstituted $C_{1-20}$ alkyl, substituted or unsubstituted $C_{2-20}$ alkenyl, substituted or unsubstituted $C_{6-20}$ aryl, nitro, amido, substituted or unsubstituted $C_{1-20}$ alkylamino, substituted or unsubstituted $C_{6-20}$ arylamino, substituted or unsubstituted $C_{1-20}$ alkylsilyl, substituted or unsubstituted $C_{1-20}$ alkoxy, or substituted or unsubstituted $C_{1-20}$ sulfonate;

$R^1$ and $R^6$ are identical to or different from each other, and are each independently, hydrogen, or substituted or unsubstituted $C_{1-20}$ alkyl;

$R^2$ and $R^3$, and $R^7$ and Fe are respectively connected with each other to form a substituted or unsubstituted $C_{6-20}$ aliphatic or aromatic ring; $R^4$, $R^5$, $R^9$, and $R^{10}$ are identical to or different from each other, and are each independently, hydrogen, halogen, substituted or unsubstituted $C_{1-20}$ alkyl, substituted or unsubstituted $C_{2-20}$ alkenyl, substituted or unsubstituted $C_{1-20}$ alkylsilyl, substituted or unsubstituted $C_{1-20}$ silylalkyl, substituted or unsubstituted $C_{1-20}$ alkoxysilyl, substituted or unsubstituted $C_{1-20}$ ether, substituted or unsubstituted $C_{1-20}$ silylether, substituted or unsubstituted $C_{1-20}$ alkoxy, substituted or unsubstituted $C_{6-20}$ aryl, substituted or unsubstituted $C_{7-20}$ alkylaryl, or substituted or unsubstituted $C_{7-20}$ arylalkyl; and $R^{11}$ and $R^{12}$ are identical to each other, and are $C_{2-20}$ alkyl.

For example, in the Chemical Formula relating to the transition metal compound, $R^2$ and $R^3$, and $R^7$ and $R^8$ may be respectively connected with each other to form $C_{6-20}$ aryl.

The transition metal compound may be represented by the following Chemical Formula 1-1.

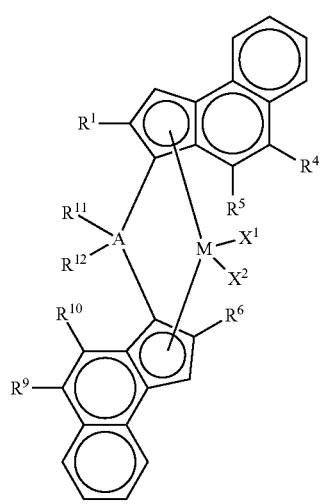

[Chemical Formula 1-1]

in the Chemical Formula 1-1,

A, M, $X^1$, $X^2$, $R^1$, $R^4$, $R^5$, $R^6$, $R^9$, $R^{10}$, $R^{11}$, and $R^{12}$ are as defined in the Chemical Formula 1.

In the Chemical Formula 1 relating to the transition metal compound, A may be silicon; M may be zirconium or hafnium; $X^1$ and $X^2$ may be each independently, halogen; $R^1$ and $R^6$ may be each independently, hydrogen, or $C_{1-5}$ linear alkyl; $R^4$, $R^5$, $R^9$, and $R^{10}$ may be hydrogen; and $R^{11}$ and $R^{12}$ may be identical to each other, and may be $C_{2-4}$ linear alkyl.

The transition metal compound may be represented by one of the following Structural Formulas:

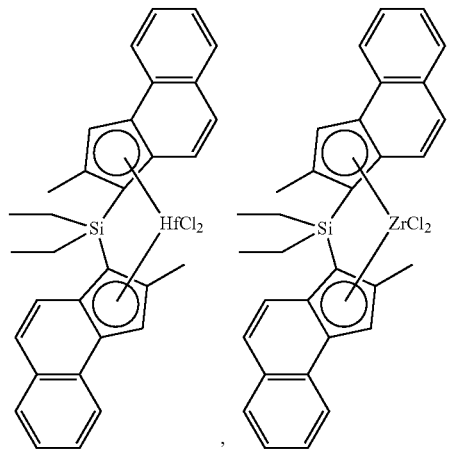

Further, the polymerization step may be conducted by a continuous type bulk-slurry polymerization process.

Advantageous Effects

According to the present invention, metallocene homopolypropylene resin that is prepared in the presence of a single catalyst comprising a specific transition metal compound, and has optimized tacticity, molecular weight distribution (MWD), melt index (MI), melting point (Tm) and residual stress rate, and narrow molecular weight distribution, and thus, gives softer feel than the existing products and has excellent tenacity without being easily torn due to high strength, is provided.

DETAILED DESCRIPTION OF THE EMBODIMENTS

Hereinafter, homopolypropylene resin for non-woven fabric and a method for preparing the same according to specific embodiments of the invention will be explained.

First, technical terms in the present specification are only for mentioning specific embodiments, and they are not intended to restrict the present invention unless there is a particular mention about them. A singular expression includes a plural expression thereof, unless it is expressly stated or obvious from the context that such is not intended. Further, the meaning of the term "comprise" or "contain" used in the specification embodies specific characteristics, areas, essences, steps, actions, elements, and/or components, and does not exclude existence or addition of other specific characteristics, areas, essences, steps, actions, elements, components, and/or groups.

As used herein, terms "a first", "a second" and the like are used to explain various constructional elements, and they are used only to distinguish one constructional element from other constructional elements.

Further, the terms used herein are only to explain specific embodiments, and are not intended to limit the present invention. A singular expression includes a plural expression thereof, unless it is expressly stated or obvious from the context that such is not intended. As used herein, the terms "comprise" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the present invention and the present invention may have various forms, specific examples will be illustrated and explained in detail below. However, it should be understood that these are not intended to limit the present invention to specific disclosure, and that the present invention includes all the modifications, equivalents or replacements thereof without departing from the spirit and technical scope of the invention.

Hereinafter, the present invention will be explained in detail.

According to one embodiment of the invention, polypropylene resin for non-woven fabric, which has tacticity of 80% to 90%, molecular weight distribution (MWD) of 2.4 or less, melt index (MI) of 20 g/10 min to 30 g/10 min, melting point (Tm) of 145° C. or less, and residual stress rate of 0.05% or less, is provided.

The present inventors confirmed during studies on polypropylene resin used for non-woven fabric that previously known metallocene homopolypropylene resin has small content of low molecular weights due to low xylene solubles or narrow molecular weight distribution, and thus, it has a disadvantage of giving tough surface feel when prepared into non-woven fabric.

Thus, the present inventors confirmed during repeated studies for improving the above problem that by optimizing tacticity of metallocene homopolypropylene resin to 80% to 90%, optimizing melt index (MI) to 20 to 30 g/10 min, optimizing melting point (Tm) to 145° C. or less, and simultaneously, optimizing residual stress rate and molecular weight distribution respectively to 0.05% or less and 2.4 or less, thus optimizing modulus, non-woven fabric having softer feel than the existing products and having excellent tenacity can be prepared.

Particularly, if soft non-woven fabric is prepared by lowering tacticity by the existing method, although soft property may be realized, strength of non-woven fabric may decrease, and thus, it may be easily torn. This is because the molecular weight distribution of resin is wide and it is difficult to sufficiently draw in the processing process. Thus, in the present invention, by comprising homopolypropylene resin obtained by a polymerization process using a single catalyst comprising a specific metallocene catalyst as an active ingredient instead of a Ziegler-Natta catalyst, tacticity may be lowered and low molecular weight distribution of about 2.4 or less may be realized, thereby simultaneously realizing softness and high strength. In the present invention, softness and high strength, which are the properties in trade-off relationship, can be realized, by comprising homopolypropylene resin prepared through a reactor-made process using a single catalyst.

The homopolypropylene resin according to the present invention can be used for preparing non-woven fabric, and it is characterized in that the tacticity of metallocene homopolypropylene resin is about 80% to 90%.

The tacticity of the homopolypropylene resin can be measured through NMR (nuclear magnetic resonance) analysis, and it may be about 80% to about 90%, or about 80% to about 87%, or about 82% to about 87%. Here, the tacticity may be a value measured using NMR (nuclear magnetic resonance) instrument. The measurement method of tacticity will be explained in detail in the experimental examples described below. The tacticity of the resin should be about 80% or more so as to secure excellent tenacity when preparing non-woven fabric, and it should be about 90% or less so as to realize non-woven fabric having softness.

The homopolypropylene resin of the present invention is characterized by having narrow molecular weight distribution (MWD) of about 2.4 or less, as well as optimized tacticity as explained above.

The molecular weight distribution of the homopolypropylene resin may be about 2.4 or less, or about 2.0 to about 2.4, or about 2.05 to about 2.4, or about 2.1 to about 2.4. Here, the homopolypropylene resin should have narrow molecular weight distribution (MWD) of about 2.4 or less so as to secure excellent tenacity when preparing non-woven fabric.

In the present invention, the molecular weight distribution is measured by measuring the weight average molecular weight (Mw) and number average molecular weight (Mn) of homopolypropylene resin, respectively, using gel permeation chromatography (GPC), and calculating the rate of the weight average molecular weight to the number average molecular weight (Mw/Mn).

Specifically, it can be measured using Waters PL-GPC220 as a gel permeation chromatography (GPC) device, and using Polymer Laboratories PLgel MIX-B 300 mm length column. Here, the measurement temperature is 160° C., 1,2,4-trichlorobenzene is used as a solvent, and the flow rate is set to 1 mL/min. Further, the sample of homopolypropylene resin is prepared at the concentration of 10 mg/10 mL, and fed in an amount of 200 μL. Using a calibration curve formed using a polystyrene standard specimen, Mw and Mn can be derived. Here, as the polystyrene standard specimen, 9 kinds having weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol may be used.

Further, the homopolypropylene resin of the present invention is characterized by optimized melt index (MI) of 20 g/10 min to 30 g/10 min and melting point (Tm) of 145° C. or less, as well as optimized tacticity range and narrow molecular weight distribution as explained above.

The melt index (MI) of the homopolypropylene resin may be about 20 g/10 min to 30 g/10 min, or about 20 g/10 min to about 26 g/10 min, or about 23 g/10 min to about 26 g/10 min, when measured at 230° C. under load of 2.16 kg according to ASTM (American society for testing and materials) standard of ASTM D 1238. Here, the melt index (MI) should be maintained within the above range so as to simultaneously secure excellent spinnability and strength of non-woven fabric. Particularly, when processing non-woven fabric using resin, if melt index (MI) is less than about 20 g/10 min, processing pressure may increase and processibility may be deteriorated. Further, if the melt index (MI) exceeds about 30 g/10 min, although pressure may be secured during processing, high strength of the product as desired may not be realized.

Further, the melting point (Tm) of the homopolypropylene resin may be about 145° C. or less, or about 130° C. to about 145° C., or about 144° C. or less, or about 132° C. to about 144° C., or about 143° C. or less, or about 133° C. to about 143° C. Particularly, the melting point (Tm) of the homopolypropylene resin should be 145° C. or less so as to secure softness when processed into fiber for non-woven fabric and prevent degradation of resin due to increase in processing temperature. Further, if the melting point (Tm) of the homopolypropylene resin exceeds 145° C., spinnability may be deteriorated to generate breakage, and thus, defect rate may increase. However, if the melting point (Tm) of the homopolypropylene resin is 130° C. or less, there may be a difficulty in producing resin or productivity may be lowered.

Meanwhile, in the present invention, the melting point of homopolypropylene resin may be measured by increasing the temperature of the homopolypropylene resin to 220° C., maintaining that temperature for 5 minutes, decreasing temperature to 20° C., and then, increasing temperature again, and defining the top of the DSC (Differential Scanning Calorimeter, manufactured by TA Instruments) curve as the melting point. Here, temperature increase and decrease rates are respectively 10° C./min, and the melting point is the result measured in the second temperature increase section.

In addition, the homopolypropylene resin is characterized by narrow residual stress rate of about 0.05%, as well as the above explained tacticity, molecular weight distribution, melt index, and melting point (Tm).

The residual stress rate may be about 0.05% or less, or about 0.005% to 0.05%, or about 0.04% or less, or about 0.006% to 0.04%, or about 0.03% or less, or about 0.006% to 0.03%.

Particularly, the residual stress rate can confirm fiber processability through rheological property test under an environment similar to a non-woven fabric manufacturing process, and it is measured according to the following Calculation Formula 1 by applying large strain to the homopolypropylene resin and conducting stress relaxation test.

$$\text{Residual stress rate}=(RS_1/RS_0)\times 100 \quad \text{[Calculation Formula 1]}$$

In the Calculation Formula 1, $RS_0$ is residual stress at one time point ($t_0$) of less than 0.05 seconds after applying 200% strain to the homopolypropylene resin, and $RS_1$ is residual stress at one time point ($t_1$) between 0.05 seconds to 1.50 seconds after applying 200% strain to the homopolypropylene resin.

Namely, according to one embodiment of the invention, if the residual stress rate according to the Calculation Formula 1 exceeds 0.05%, when conducting melt blowing of the polypropylene resin, a possibility of generating breakage may be too high, thus increasing defect rate when preparing non-woven fabric. The residual stress rate should be maintained at 0.05% or less, or 0.04% or less, or 0.03% or less, so as to minimize breakage when processing non-woven fabric. Particularly, fiber is spun in a molten state and drawn in a semi-molten state through cooling, but if residual stress is high, a tendency to shrink may increase, thus increasing the possibility of generating breakage.

In the Calculation Formula 1, $RS_0$ denotes residual stress immediately after applying 200% strain to the homopolypropylene resin, for example, at one time point (to) of less than 0.05 seconds, under 235° C. Further, in the Calculation Formula 1, $RS_1$ denotes residual stress within about 1.5 seconds after the to [for example, at one time point ($t_1$) between 0.05 seconds to 2.00 seconds], under the same condition as the $RS_0$.

Specifically, in the Calculation Formula 1, the to may be selected from 0.01 seconds, or 0.015 seconds, or 0.02 seconds, or 0.025 seconds, or 0.03 seconds, or 0.035 seconds, or 0.04 seconds, or 0.045 seconds. Further, in the Calculation Formula 1, the $t_1$ may be selected from 0.05 seconds, or 0.10 seconds, or 0.20 seconds, or 0.30 seconds, or 0.40 seconds, or 0.50 seconds, or 0.60 seconds, or 0.70 seconds, or 0.80 seconds, or 0.90 seconds, or 1.00 seconds, or 1.10 seconds, or 1.20 seconds, or 1.30 seconds, or 1.40 seconds, or 1.50 seconds, or 1.60 seconds, or 1.70 seconds, or 1.80 seconds, or 1.90 seconds, or 2.00 seconds.

Preferably, in order to easily secure available data when measuring residual stress, it may be advantageous that to is 0.02 seconds, and $t_1$ is 1.00 second, in the Calculation Formula 1.

Further, the residual stress rate of the homopolypropylene resin is measured under a similar environment (for example, 235° C.) to the process condition for conducting melt blowing when preparing non-woven fabric. The temperature of 235° C. corresponds to a temperature suitable for completely dissolving homopolypropylene resin to conduct melt blowing.

In the homopolypropylene resin of the present invention, it is preferable that molecular weight distribution (MWD) is also maintained in a low range as explained above so as to maintain residual stress rate within the above explained optimum range and secure excellent fiber processability.

Since the homopolypropylene resin according to one embodiment of the invention has narrow molecular weight distribution, as well as optimized tacticity, molecular weight distribution (MWD), melt index (MI), melting point Tm), and residual stress rate, when used for non-woven fabric, it can give softer feel than the existing products and realize excellent tenacity without being easily torn due to high strength.

The homopolypropyleneresin for non-woven fabric according to one embodiment of the invention, having the above properties and constructional characteristics, may be prepared by a method comprising a step of polymerizing propylene in the presence of a single catalyst comprising only a transition metal compound represented by the following Chemical Formula 1 as a catalytically active ingredient. Thus, according to another embodiment of the invention, a method for preparing the above explained homopolypropylene resin for non-woven fabric is provided.

[Chemical Formula 1]

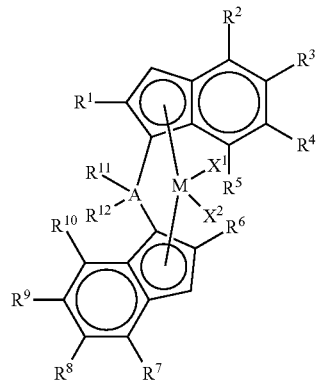

in the Chemical Formula 1,

A is carbon, silicon or germanium,

M is Group 4 transition metal;

$X^1$ and $X^2$ are identical to or different from each other, and are each independently, halogen, substituted or unsubstituted $C_{1-20}$ alkyl, substituted or unsubstituted $C_{2-20}$ alkenyl, substituted or unsubstituted $C_{6-20}$ aryl, nitro, amido, substituted or unsubstituted $C_{1-20}$ alkylamino, substituted or unsubstituted $C_{6-20}$ arylamino, substituted or unsubstituted $C_{1-20}$ alkylsilyl, substituted or unsubstituted $C_{1-20}$ alkoxy, or substituted or unsubstituted $C_{1-20}$ sulfonate;

$R^1$ and $R^6$ are identical to or different from each other, and are each independently, hydrogen, or substituted or unsubstituted $C_{1-20}$ alkyl;

$R^2$ and $R^3$, and $R^7$ and $R^8$ are respectively connected with each other to form a substituted or unsubstituted $C_{6-20}$ aliphatic or aromatic ring;

$R^4$, $R^5$, $R^9$, and $R^{10}$ are identical to or different from each other, and are each independently, hydrogen, halogen, substituted or unsubstituted $C_{1-20}$ alkyl, substituted or unsubstituted $C_{2-20}$ alkenyl, substituted or unsubstituted $C_{1-20}$ alkylsilyl, substituted or unsubstituted $C_{1-20}$ silylalkyl, substituted or unsubstituted $C_{1-20}$ alkoxysilyl, substituted or unsubstituted $C_{1-20}$ ether, substituted or unsubstituted $C_{1-20}$ silylether, substituted or unsubstituted $C_{1-20}$ alkoxy, substituted or unsubstituted $C_{6-20}$ aryl, substituted or unsubstituted $C_{7-20}$ alkylaryl, or substituted or unsubstituted $C_{7-20}$ arylalkyl;

$R^{11}$ and $R^{12}$ are identical to each other, and are $C_{2-20}$ alkyl.

In the specification, the following terms may be defined as follows unless specifically limited.

Halogen may be fluorine (F), chlorine (Cl), bromine (Br) or iodine (I).

A $C_{1-20}$ alkyl, namely, an alkyl group having a carbon number of 1 to 20 may be a linear, branched or cyclic alkyl group. Specifically, the C1-20 alkyl group may be a C1-20 linear alkyl group; a C1-10 linear alkyl group; a C1-5 linear alkyl group; a C3-20 branched or cyclic alkyl group; a C3-15 branched or cyclic alkyl group; or a C3-10 branched or cyclic alkyl group. More specifically, the C1-20 alkyl group may be a methyl, an ethyl, an n-propyl, an iso-propyl, an n-butyl, an iso-butyl, a tert-butyl, an n-pentyl, an iso-pentyl, a neo-pentyhl, or a cyclohexyl group.

A $C_{1-20}$ alkoxy, namely, an alkoxy group having a carbon number of 1 to 20 means C1-20 linear or branched alkyl group bonded with oxygen (—OR). Specifically, the alkoxy group includes a C1-20, more specifically, a C1-6 alkoxy group. As specific examples of the alkoxy group, a methoxy, an ethoxy, a propoxy, a butoxy, or a t-butoxy group, and the like may be mentioned.

A $C_{2-20}$ alkoxyalkyl, namely, an alkoxyalkyl group having a carbon number of 2 to 20 means a functional group in which the above explained alkoxy group is substituted at the carbon of a linear or branched alkyl group instead of hydrogen. Specifically, the alkoxyalkyl group includes a C2-20, more specifically, a C2-12 alkoxyalkyl group. As specific examples of the alkoxyalkyl group, a methoxymethyl, a tert-butoxymethyl, a tert-butoxyhexyl, 1-ethoxyethyl, 1-methyl-1-methoxyethyl group, and the like may be mentioned.

A $C_{2-20}$ alkenyl, namely, an alkenyl group having a carbon number of 2 to 20 may be a linear, branched or cyclic alkenyl group. Specifically, the C2-20 alkenyl group may be a C2-20 linear alkenyl group, a C2-10 linear alkenyl group, a C2-5 linear alkenyl group, a C3-20 branched alkenyl group, a C3-15 branched alkenyl group, a C3-10 branched alkenyl group, a C5-20 cyclic alkenyl group, or a C5-10 cyclic alkenyl group. More specifically, the C2-20 alkenyl group may be an ethenyl, a propenyl, a butenyl, a pentenyl, or a cyclohexenyl group, and the like.

A $C_{3-20}$ cycloalkyl, namely, a cycloalkyl group having a carbon number of 3 to 20 means a C3-20 cyclic saturated hydrocarbon group. Specifically, the cycloalkyl group includes a C3-6 cycloalkyl group. As specific examples of the cycloalkyl group, a cyclopropyl, a cyclobutyl, or a cyclohexyl group, and the like may be mentioned.

A $C_{6-20}$ aryl, namely, an aryl group having a carbon number of 6 to 20 may mean monocyclic, bicyclic or tricyclic aromatic hydrocarbon. Specifically, the C6-20 aryl group may be a phenyl, a naphthyl, or an anthracenyl group, and the like.

A $C_{7-20}$ alkylaryl, namely, an alkylaryl group having a carbon number of 7 to 30 may mean a substituent group in which one or more hydrogen atoms of aryl are substituted with alkyl. Specifically, C7-20 alkylaryl may be methylphenyl, ethylphenyl, n-propylphenyl, iso-propylphenyl, n-butylphenyl, iso-butylphenyl, tert-butylphenyl or cyclohexylphenyl, and the like.

A $C_{7-20}$ arylalkyl, namely, an arylalkyl group having a carbon number of 7 to 20 may mean a substituent in which one or more hydrogen atoms of alkyl are substituted with aryl. Specifically, the C7-20 arylalkyl may be a benzyl, a phenylpropyl or a phenylhexyl group, and the like.

A $C_{6-20}$ aryloxy, namely, an aryloxy group having a carbon number of 6 to 20 means an aryl group bonded with oxygen (OAr), wherein the aryl group is as defined above. Specifically, the aryloxy group includes a C6-20, more specifically, a C6-12 aryloxy group. As specific examples of the aryloxy group, a phenoxy group, and the like may be mentioned.

A silyl group means a —$SiH_3$ radical derived from silane, wherein one least one hydrogen atoms in the silyl group may be substituted with various organic groups such as an alkyl group, an alkoxy, group, a halogen group, and the like. Here, the alkyl group, alkoxy group, and halogen group are as defined above.

A nitro group means a —$NO_2$ radical in which one nitrogen atom and two oxygen atoms are bonded.

A $C_{1-20}$ sulfonate, namely, a sulfonate group having a carbon number of 1 to 20 means a functional group in which hydrogen of a sulfonic acid group (—$SO_3H$) is substituted with an alkyl group, wherein the alkyl group is as defined above. Specifically, the sulfonate group may be —$SO_3R$ (wherein, R is a C1-20 linear or branched alkyl group).

An amido group means an amino group bonded to a carbonyl group (C=0)

A $C_{1-20}$ alkylamino, namely, an alkylamino group having a carbon number of 1 to 20 means a functional group in which at least one hydrogen atoms of an amino group (—$NH_2$) are substituted with an alkyl group, wherein the alkyl group is as defined above. Specifically, the alkylamino group may be —$NR_2$ (wherein, each of R's may be a hydrogen atom or a C1-20 linear or branched alkyl group, provided that both R's are not a hydrogen atoms).

A $C_{6-20}$ arylamino, namely, an arylamino group having a carbon number of 6 to 20 means a functional group in which at least one hydrogen atoms of an amino group (—$NH_2$) are substituted with an aryl group, wherein the aryl group is as defined above.

A $C_{6-20}$ aliphatic or aromatic ring, namely, an aliphatic or aromatic ring having a carbon number of 6 to 20 means a cycloalkyl or an aryl group, wherein the cycloalkyl group and aryl group are as defined above.

A $C_{1-20}$ silylalkyl, namely, a silylalkyl group having a carbon number of 1 to 20 means a functional group in which at least one hydrogen atoms of an alkyl group are substituted with a silyl group, wherein the alkyl group and silyl group are as defined above.

$C_{1-20}$ ether, namely, ether having a carbon number of 1 to 20 means a hydrocarbyl group including a —O— radical, wherein at least one hydrogen atoms in the ether group may be substituted with various organic groups such as silyl group, and the like. Wherein the silyl group is as defined above.

An alkylidene group means a divalent aliphatic hydrocarbon group in which two hydrogen atoms are removed from the same carbon atom of an alkyl group. Specifically, the alkylidene group includes a C1-20, more specifically, a C1-12 alkylidene group. As specific examples of the alkylidene group, a propane-2-ylidene group, and the like may be mentioned.

An arylene group means a divalent aromatic hydrocarbon group in which two hydrogen atoms are removed from the same carbon atom of an aryl group. Specifically, the arylene group includes a C6-20, more specifically, a C6-12 arylene group. As specific examples of the arylene group, a phenylene group, and the like may be mentioned.

A hydrocarboyl group means a monovalent hydrocarbon group having a carbon number of 1 to 60, consisting only of carbon and hydrogen, irrespective of the structure, such as an alkyl, an aryl, an alkenyl, an alkylaryl, an arylakyl group, and the like.

Further, unless specifically defined in the specification, 'a combination thereof' means that two or more functional groups are bonded by a single bond, a double bond (ethylene group), a triple bond (acetylene group), or a linking group such as a C1-20 alkylene group (for example, methylene group ($-CH_2-$) or ethylene group ($-CH_2CH_2-$)), or two more functional groups are condensed and linked.

Particularly, the present invention is characterized by using a single catalyst comprising a transition metal compound of the above Chemical Formula 1 as a single component, instead of a hybrid catalyst suitable for processing such as injection due to wide molecular weight distribution, in order to prepare homopolypropylene resin for non-woven fabric that is soft but has excellent strength.

Further, in the existing process, two kinds of resins having different properties may be mixed to prepare non-woven fabric, while in the present invention, softness and strength can be simultaneously fulfilled with one kind of resin prepared by a reactor-made process.

The homopolypropylene may be prepared by a polymerization process of contacting a catalyst comprising a transition metal compound represented by the Chemical Formula 1 with propylene.

Further, according to one embodiment of the invention, the homopolymerization of propylene may be conducted under hydrogen gas. Here, the hydrogen gas may be introduced such that the amount became about 2000 ppm or less, or about 10 ppm to about 2000 ppm, or about 50 ppm to about 1500 ppm, based on the total weight of propylene. By controlling the amount of hydrogen gas used, sufficient catalytic activity may be exhibited, and simultaneously, the molecular weight distribution and flowability of prepared homopolypropylene resin may be controlled within desired ranges, thereby preparing propylene-butene copolymer having appropriate properties according to use.

As a transition metal compound used as a catalyst for preparing the homopolypropylene resin, one or more kinds of transition metal compounds represented by the Chemical Formula 1 may be used.

In the Chemical Formula 1, $R^2$ and $R^3$, and $R^7$ and $R^8$ may be respectively connected with each other to form $C_{6-20}$ aryl.

In the Chemical Formula 1, A may be silicon (Si).

In the Chemical Formula 1, M may be zirconium (Zr) or hafnium (Hf).

In the Chemical Formula 1, each of $X^1$ and $X^2$ may be halogen. Specifically, each of $X^1$ and $X^2$ may be chloro.

In the Chemical Formula 1, each of $R^1$ and $R^6$ may be hydrogen or $C_{1-5}$ linear alkyl, or hydrogen or methyl.

In the Chemical Formula 1, $R^4$, $R^5$, $R^9$, and $R^{10}$ may be hydrogen.

In the Chemical Formula 1, $R^{11}$ and $R^{12}$ may be identical to each other, and may be a $C_{2-4}$ linear alkyl group.

In the Chemical Formula 1, $R^{12}$ may be ethyl or 6-(t-butoxy)-hexyl.

For example, as the transition metal compound, a transition metal compound of the Chemical Formula 1 wherein A is silicon; M is Zr or Hf; each of $X^1$ and $X^2$ is halogen; each of $R^1$ and $R^6$ is hydrogen or methyl; $R^2$ and $R^3$, and $R^7$ and $R^8$ are respectively connected with each other to form $C_{6-20}$ aryl; $R^4$, $R^5$, $R^9$, and $R^{10}$ are hydrogen; $R^{11}$ and $R^{12}$ are identical to each other, and $C_{2-4}$ linear alkyl group, may be used.

Further, according to specific embodiment, the transition metal compound may be represented by the following Chemical Formula 1-1.

[Chemical Formula 1-1]

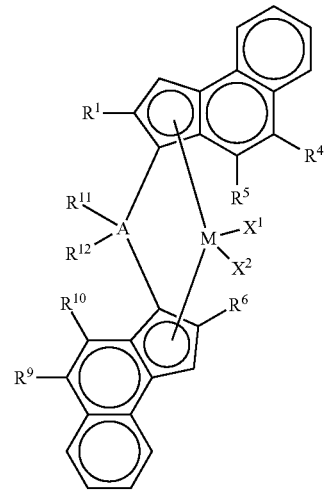

in the Chemical Formula 1-1,

A, M, $X^1$, $X^2$, $R^1$, $R^4$, $R^5$, $R^6$, $R^9$, $R^{10}$, $R^{11}$, and $R^{12}$ are as defined in the Chemical Formula 1.

The transition metal compound of the above structure may cause appropriate steric hindrance to secure the above explained effects more effectively.

Here, the substituents of the silicon bridge, $R^{11}$ and $R^{12}$, may be identical to each other and each may be a $C_{2-10}$ alkyl group, more specifically, a $C_{2-4}$ linear alkyl group, more specifically, an ethyl group, so as to increase solubility and improve support efficiency. In case a methyl group is included as the substituent of the bridge, when preparing a supported catalyst, solubility may not be good, and thus, support reactivity may be lowered.

Further, as the center metal of the catalyst, Zr and Hf are preferable, wherein Zr increases the activity, and Hf increases the melting point (Tm) of produced resin by about 2° C. to 3° C., and thus, they can be appropriately applied according to use.

Preferably, the transition metal compound may be represented by one of the following Structural Formulas:

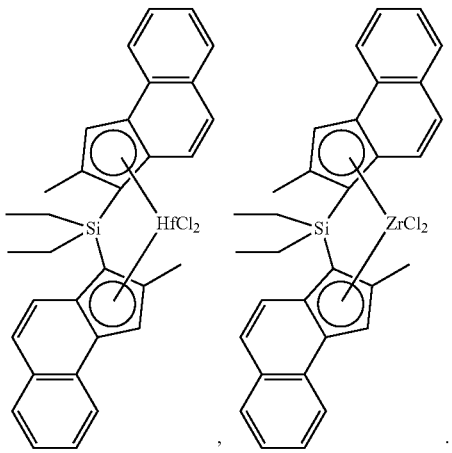

The transition metal compound represented by the Chemical Formula 1 may be synthesized applying known reactions, and for more detailed synthesis method, Preparation Examples 1 to 2 described below may be referred to.

Meanwhile, a catalyst comprising the transition metal compound having the structure of the Chemical Formula 1 may further comprise various cocatalysts so as to achieve high activity and improve process stability. As the cocatalyst compound, one or more compounds represented by the following Chemical Formula 2 or Chemical Formula 3 may be included.

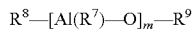   [Chemical Formula 2]

In the Chemical Formula 2,
$R^7$, $R^8$ and $R^9$ may be each independently, hydrogen, halogen, a C1-20 hydrocarbyl group, or a C1-20 hydrocarbyl group substituted with halogen,
m is an integer equal to or greater than 2,

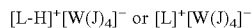   [Chemical Formula 3]

In the Chemical Formula 3,
L is neutral or cationic Lewis base,
W is a Group 13 element, J's are each independently, a C1-20 hydrocarbyl group; a C1-20 hydrocarbyloxy group; or a C1-20 hydrocarbyl group or a C1-20 hydrocarbyloxy group, of which one or more hydrogen atoms are substituted with one or more substituents selected from halogen, a C1-20 hydrocarbyloxy group or a C1-20 hydrocarbyl (oxy) silyl group.

For example, in the present invention, various cocatalysts represented by the Chemical Formula 2 or Chemical Formula 3 may be used as the cocatalyst. For example, as the cocataylst of the Chemical Formula 2, methylaluminoxane, ethylaluminoxane, isobutylaluminoxane, tert-butyl aluminoxane or a mixture thereof may be used. Further, as the cocataylst of the Chemical Formula 3, trimethylammonium tetrakis (pentafluorophenyl)borate, triethylammonium tetrakis (pentafluorophenyl)borate, N,N-dimethylanilinium tetrakis (pentafluorophenyl)borate, N,N-dimethylanilinium n-butyltris (pentafluorophenyl)borate, N,N-dimethylanilinium benzyltris (pentafluorophenyl)borate, N,N-dimethylanilinium tetrakis (4-(t-butyldimethylsilyl)-2,3,5,6-tetrafluorophenyl)borate, N,N-dimethylanilinium tetrakis (4-(triisopropylsilyl)-2,3,5,6-tetrafluorophenyl)borate, N, N-dimethylanilinium pentafluorophenoxytris (pentafluorophenyl)borate, N, N-dimethyl-2,4,6-trimethylanilinium tetrakis (pentafluorophenyl)borate, trimethylammonium tetrakis (2,3,4,6-tetrafluorophenyl)borate, N, N-dimethylanilinium tetrakis (2,3,4,6-tetrafluorophenyl)borate, hexadecyldimethylammonium tetrakis (pentafluorophenyl) borate, N-methyl-N-dodecylanilinium tetrakis (pentafluorophenyl)borate or methyldi (dodecyl)ammonium tetrakis (pentafluorophenyl)borate, and mixtures thereof may be used.

The content of the cocatalyst used may be appropriately controlled according to the aimed properties or effects of the catalyst and homopolypropylene resin.

Further, the catalyst comprising the transition metal compound having the structure of the Chemical Formula 1 may be used in the form of a supported catalyst wherein the transition metal compound of the Chemical Formula 1, and according to circumstances, the cocatalyst of the Chemical Formula 2 or Chemical Formula 3 are supported in a catalyst support.

As the catalyst support, those containing a hydroxyl group or a siloxane group on the surface may be used. Specifically, as the catalyst support, those containing highly reactive hydroxyl group or siloxane group, obtained by drying at high temperature to remove moisture on the surface, may be used. More specifically, as the catalyst support, silica, alumina, magnesia or a mixture thereof may be used. The catalyst support may be dried at high temperature, and may commonly comprise oxide, carbonate, sulfate, nitrate components such as $Na_2O$, $K_2CO_3$, $BaSO_4$ and $Mg(NO_3)_2$, and the like.

The supported catalyst may be formed by sequentially supporting the cocatalyst of the Chemical Formula 2, the transition metal compound of the Chemical Formula 1, and the cocatalyst of the Chemical Formula 3 on the catalyst support. The supported catalyst having a structure determined according to the sequence of supporting may realize high activity and excellent process stability during the preparation process of homopolypropylene resin.

More specifically, the supported catalyst may be a single supported catalyst comprising only a transition metal compound represented by the Chemical Formula 1 as a catalytically active ingredient.

The homopolypropylene resin may be prepared by a continuous polymerization process, and various polymerization processes known as the polymerization reaction of olefin monomers, such as continuous type solution polymerization, continuous type bulk polymerization, continuous type suspension polymerization, continuous type slurry polymerization, or continuous type emulsion polymerization, and the like may be adopted. However, in order to obtain uniform molecular weight distribution as explained above and prepare homopolypropylene resin suitable for nonwoven fabric fiber, continuous type bulk-slurry polymerization is preferable.

Specifically, the polymerization reaction may be conducted at a temperature of about 40° C. to 110° C., or about 50° C. to 100° C., or about 60° C. to 90° C. Further, the polymerization process may be conducted under pressure range known in the field of polypropylene resin preparation, for example, under pressure of about 1 to 100 kgf/cm². For example, although varies according to the size of a practical reactor, the continuous type polymerization process may be conducted with the propylene input amount of about 10 kg to about 80 kg, or about 20 kg to about 65 kg, or about 30 kg to about 50 kg per hour.

Further, in the polymerization reaction, the catalyst may be used while being dissolved or diluted in a solvent such as pentane, hexane, heptanes, nonane, decane, toluene, benzene, dichloromethane, chlorobenzene, and the like. Here, a small amount of water or air that may have an adverse influence on the catalyst may be previously removed by treating the solvent with a small amount of alkylaluminum, and the like. For example, the catalyst may be used in the form of a mud catalyst mixed with oil or grease, and the content of the catalyst may be about 10% to about 25%, or about 12% to about 20%, or about 14% to about 18%, based on the total weight comprising oil, grease, and the like.

Since the method for preparing homopolypropylene resin according to another embodiment of the invention uses a single catalyst comprising only a transition metal compound represented by the Chemical Formula 1 as a catalytically active ingredient, the prepared homopolypropylene resin may have optimized tacticity, molecular weight distribution (MWD), melt index (MI), melting point (Tm), and residual stress rate, and simultaneously, have narrow molecular weight distribution, and thus, when used for non-woven fabric, can give softer feel than the existing products, and realize excellent tenacity without being easily torn due to high strength.

Thus, according to yet another embodiment of the present invention, a resin composition for non-woven fabric comprising the above explained homopolypropylene resin, and a non-woven fabric product prepared using the same are provided.

Specifically, the resin composition for non-woven fabric may comprise masterbatch additives such as Exolit OP 950 together with the above explained homopolypropylene resin, and it may be prepared by a method comprising the steps of mixing masterbatch additives with the homopolypropylene resin and extruding the mixture.

Further, the extrusion process for preparing the resin composition may be conducted according to a common method. For example, it may be conducted under conditions of about 150° C. to about 250° C., about 100 rpm to about 1000 rpm, using an extruder such as a 25 mm twin-screw extruder, and the like.

Since the resin composition comprises the above explained homopolypropylene resin, it may have optimized tacticity, molecular weight distribution (MWD), melt index (MI), melting point (Tm) and residual stress rate, and simultaneously, have narrow molecular weight distribution, and thus, it may be useful for a resin composition for non-woven fabric capable of simultaneously realizing softness and high strength, which are in trade-off relationship, when preparing non-woven fabric.

Meanwhile, the present invention provides non-woven fabric prepared using the resin composition, and the non-woven fabric may be spunbond non-woven fabric prepared by a melt blowing process.

Specifically, the non-woven fabric may be prepared by feeding the molten resin composition to a melt pump (65 rpm), and then, feeding it to a melt blowing die equipped with an outlet, thereby extruding into a ultrafine fiber web, using a Brabender conical type twin screw extruder. Here, the melt blowing process may be conducted at a melting temperature of 235° C., screw speed of 120 rpm, die temperature of 235° C., primary air temperature and pressure of 300° C. and 60 kPa (8.7 psi), polymer treatment speed of 5.44 kg/hr, and collector/die distance of 15.2 cm.

Hereinafter, preferable examples are presented for better understanding of the present invention. However, these examples are presented only as the illustrations of the present invention, and the scope of the present invention is not limited thereby.

EXAMPLES

Preparation of Catalyst

Preparation Example 1: Preparation of a Transition Metal Compound and a Supported Catalyst

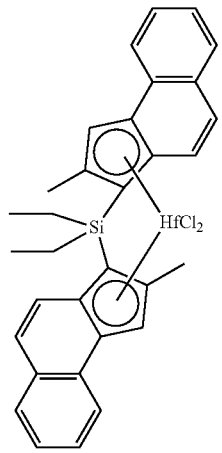

Step 1) Preparation of (diethylsilane-diyl)-bis (2-methyl-4,5-benzoindenyl)silane 2-methyl-4,5-benzoindene (20.0 g) was dissolved in a toluene/THF=10/1 solution (220 Ml), and an n-butyllithium solution (2.5 M, hexane solvent, 46 mL) was slowly added dropwise at 0° C., and then, the solution was stirred at room temperature for a day. Thereafter, diethyldichlorosilane (8.6 g) was slowly added dropwise to the mixed solution at −78° C., and the solution was stirred for about 10 minutes, and then, stirred at room temperature for a day. Thereafter, water was added to separate an organic layer, and then, the solvent was distilled under reduced pressure to obtain (diethylsilane-diyl)-bis (2-methyl-4,5-benzoindenyl)silane.

Step 2) Preparation of [(diethylsilane-diyl)-bis(2-methyl-4,5-benzoindenyl)]hafnium dichloride (Diethylsilane-diyl)-bis (2-methyl-4,5-benzoindenyl)silane prepared in the step 1 was dissolved in a toluene/THF=5/1 solution (120 mL), an n-butyllithium solution (2.5 M, hexane solvent, 46 mL) was slowly added dropwise at −78° C., and then, the solution was stirred for a day. To the reaction solution, hafnium chloride (17.6 g) diluted in toluene (20 mL) was slowly added dropwise at −78° C., and the solution was stirred at room temperature for a day. The solvent of the reaction solution was removed under reduced pressure, dichloromethane was put and the solution was filtered, and then, the filtrate was distilled under reduced pressure and removed. By recrystallization with toluene and hexane, high purity rac-[(diethylsilane-diyl)-bis (2-methyl-4,5-benzoindenyl)]hafnium dichloride (11.9 g, 30%, rac:meso=20:1) was obtained.

Step 3) Preparation of a Supported Catalyst

Into a 3 L reactor, 100 g of silica and 10 wt % methylaluminoxane (670 g) were put, and the mixture was reacted at 90° C. for 24 hours. After precipitation, the upper part was removed, and the remaining part was washed with toluene two times. The ansa-metallocene compound rac-[(diethylsilane-diyl)-bis (2-methyl-4,5-benzoindenyl)]hafnium dichloride (5 g) prepared in the step 2) was diluted in toluene and added to a reactor, and then, reacted at 70° C. for 5 hours. After the completion of the reaction, when precipitation was finished, the upper part solution was removed, and the remaining reaction product was washed with toluene, washed with hexane again, and vacuum dried to obtain 150 g of silica supported metallocene catalyst in the form of solid particles.

Preparation Example 2: Preparation of a Transition Metal Compound and a Supported Catalyst

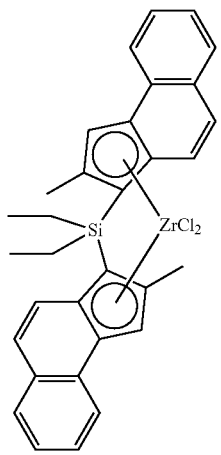

Step 1) Preparation of (diethylsilane-diyl)-bis (2-methyl-4,5-benzoindenyl)silane 2-methyl-4,5-benzoindene (20.0 g) was dissolved in a toluene/THF=10/1 solution (220 mL), and an n-butyllithium solution (2.5 M, hexane solvent, 46 mL) was slowly added dropwise at 0° C., and then, the solution was stirred at room temperature for a day. Thereafter, diethyldichlorosilane (8.6 g) was slowly added dropwise to the mixed solution at −78° C., and the solution was stirred for about 10 minutes, and then, stirred at room temperature for a day. Thereafter, water was added to separate an organic layer, and then, the solvent was distilled under reduced pressure to obtain (diethylsilane-diyl)-bis (2-methyl-4,5-benzoindenyl)silane.

Step 2) Preparation of [(diethylsilane-diyl)-bis(2-methyl-4,5-benzoindenyl)]zirconium dichloride (Diethylsilane-diyl)-bis (2-methyl-4,5-benzoindenyl)silane prepared in the step 1 was dissolved in a toluene/THF=5/1 solution (120 mL), an n-butyllithium solution (2.5 M, hexane solvent, 46 mL) was slowly added dropwise at −78° C., and then, the solution was stirred for a day. To the reaction solution, zicronium chloride (12.8 g) diluted in toluene (20 mL) was slowly added dropwise at −78° C., and the solution was stirred at room temperature for a day. The solvent of the reaction solution was removed under reduced pressure, dichloromethane was put and the solution was filtered, and then, the filtrate was distilled under reduced pressure and removed. By recrystallization with toluene and hexane, high purity rac-[(diethylsilane-diyl)-bis (2-methyl-4,5-benzoindenyl)]zirconium dichloride (10.0 g, 29%, rac: meso=22:1) was obtained.

Step 3) Preparation of a Supported Catalyst

Into a 3 L reactor, 100 g of silica and 10 wt % methylaluminoxane (670 g) were put, and the mixture was reacted at 90° C. for 24 hours. After precipitation, the upper part was removed, and the remaining part was washed with toluene two times. The ansa-metalocene compound rac-[(diethylsilane-diyl)-bis (2-methyl-4,5-benzoindenyl)]zirconium dichloride (4.4 g) prepared in the step 2) was diluted in toluene and added to a reactor, and then, reacted at 70° C. for 5 hours. After the completion of the reaction, when precipitation was finished, the upper part solution was removed, and the remaining reaction product was washed with toluene, washed with hexane again, and vacuum dried to obtain 150 g of silica supported metallocene catalyst in the form of solid particles.

Comparative Preparation Example 1: Preparation of a Transition Metal Compound and a Supported Catalyst A silica supported metallocene catalyst in the form of solid particles was prepared by the same method as the step 3) of Preparation Example 2, using a transition metal compound represented by the following Chemical Formula A and [(6-t-butoxyhexylmethylsilane-diyl)-bis (2-methyl-4-tert-butylphenylindenyl)]zirconium chloride.

[Chemical Formula A]

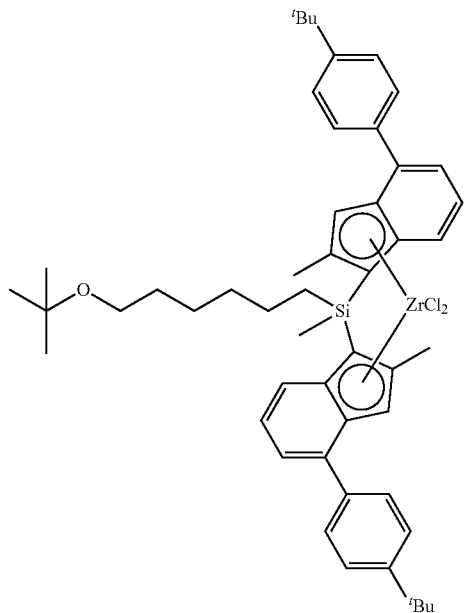

In the Chemical Formula A, $^t$Bu denotes tert-butyl (tertiary butyl).

Comparative Preparation Example 2: Preparation of a Transition Metal Compound and a Supported Catalyst A supported catalyst was prepared by the same method as the step 3) of Preparation Example 2, using a transition metal compound represented by the following Chemical Formula B and [(6-t-butoxyhexylmethylsilane-diyl)-bis (2-methyl-4-tert-butylphenylindenyl)]zirconium chloride.

[Chemical Formula B]

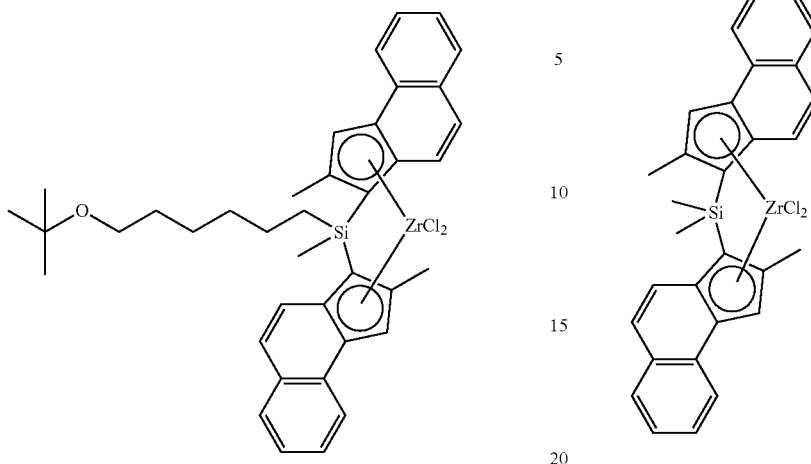

[Chemical Formula C]

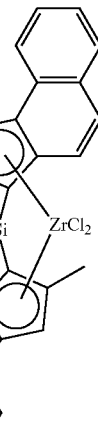

Comparative Preparation Example 3: Preparation of a Hybrid Supported Catalyst

A hybrid supported catalyst was prepared using [(6-t-butoxyhexyl) (methyl)silane-diyl)-bis (2-methyl-4,5-benzoindenyl)]zirconium dichloride prepared according to the steps 1) and 2) of Comparative Example 2, and [(6-t-butoxyhexylmethylsilane-diyl)-bis (2-methyl-4-tert-butylphenylindenyl)]zirconium chloride represented by the Chemical Formula A of Comparative Preparation Example 1, as transition metal compounds.

3 g of silica was weighed beforehand in a Shlenk flask, and then, 13 mmol of methylaluminoxane (MAO) was put, and they were reacted at 95° C. for 24 hours. After precipitation, the upper part was removed and the remaining part was washed with toluene one time. 60 μmol of the transition metal compound [(6-t-butoxyhexyl) (methyl)silane-diyl)-bis (2-methyl-4,5-benzoindenyl)]zirconium dichloride prepared in Comparative Example 2 was dissolved in toluene, and reacted at 75° C. for 5 hours. After the completion of the reaction, when precipitation was finished, the upper part solution was removed, and the remaining reaction product was washed with toluene one time. Subsequently, 20 μmol of the transition metal compound [(6-t-butoxyhexylmethylsilane-diyl)-bis (2-methyl-4-tert-butylphenylindenyl)]zirconium chloride prepared in Comparative Example 1 was dissolved in toluene, and then, additionally reacted at 75° C. for 2 hours.

After the completion of the reaction, when precipitation was finished, the upper part solution was removed, and the remaining reaction product was washed with toluene, washed with hexane again, and vacuum dried to obtain 4.6 g of silica supported metallocene catalyst in the form of solid particles.

Comparative Preparation Example 4: Preparation of a Transition Metal Compound and a Supported Catalyst A supported catalyst was prepared by the same method as the step 3) of Preparation Example 2, using the transition metal compound represented by the following Chemical Formula C, [(dimethylsilane-diyl)-bis (2-methyl-4,5-benzoindenyl)]zirconium dichloride.

Preparation of Polypropylene

Examples 1 and 2: Continuous Type Bulk-Slurry Homopolymerization of Propylene

The bulk-slurry polymerization of propylene was progressed using continuous two loop reactors, in the presence of the silica supported metallocene catalysts according to Preparation Examples 1 and 2.

Here, triethylaluminum (TEAL) and hydrogen gas were introduced respectively using a pump, and triethylaluminum (TEAL) and hydrogen gas were introduced in the contents described in the following Table 1, based on the content of propylene continuously introduced. Further, for bulk-slurry polymerization, mud catalysts were used wherein 16 wt % of the supported catalysts prepared according to Preparation Examples 1 and 2 were mixed with oil, grease. The temperature of the reactor was about 70° C., and the reactor was driven such that production amount per hour became about 40 kg.

Specific reaction conditions for the polymerization processes of Examples 1 and 2 are as shown in the following Table 1, and through the polymerization process, homopolypropylene (homo mPP) resin of Example 1 was obtained.

Comparative Example 1: Continuous Type Bulk-Slurry Homopolymerization of Propylene A polymerization process was conducted by the same method as Example 1, except that the metallocene single supported catalyst prepared in Comparative Preparation Example 1 was used instead of the supported catalyst of Preparation Example 1, and the hydrogen input was changed to 350 ppm, thus obtaining homopolypropylene resin of Comparative Example 1.

Comparative Example 2: Homopolypropylene Resin Prepared Using Ziegler-Natta Catalyst Homopolypropylene resin (Z/N homoPP, Manufacturing Company: LG Chem, Ltd., H7700) prepared using a Ziegler-Natta catalyst was prepared.

Comparative Example 3: Continuous Type Bulk-Slurry Homopolymerization of Propylene A polymerization process was conducted by the same method as Example 1, except that the hybrid supported catalyst prepared in Comparative Preparation Example 2 was used instead of the supported catalyst of Preparation Example 1, thus obtaining homopolypropylene resin of Comparative Example 3.

Comparative Example 4: Continuous Type Bulk-Slurry Homopolymerization of Propylene A polymerization process was conducted by the same method as Example 1, except that the metallocene single supported catalyst prepared in Comparative Preparation Example 3 was used instead of the supported catalyst of Preparation Example 1, thus obtaining homopolypropylene resin of Comparative Example 4.

temperature, and 770 g of propylene was introduced. The mixture was stirred for 10 minutes, and 45 mg of the supported catalyst prepared in Comparative Example 2 was dispersed in 20 mL of hexane and prepared in the form of slurry, and introduced into the reactor using a nitrogen pressure. Here, about 100 ppm of hydrogen gas was introduced together with the catalyst. Thereafter, the temperature of the reactor was slowly raised to 70° C., and then, polymerization was conducted for 1 hour. After the completion of the reaction, unreacted propylene was vented.

Comparative Example 6: Batch Type Homopolymerization of Propylene

A polymerization process was conducted by the same method as Comparative Example 5, except that the polym-

TABLE 1

|  | Example 1 | Example 2 | Comparative Example 1 | Comparative Example 2 | Comparative Example 3 | Comparative Example 4 |
|---|---|---|---|---|---|---|
| Kind of polymer | Homo mPP | Homo mPP | Homo mPP | Z/N homoPP | Homo mPP | Homo mPP |
| catalyst | Preparation Example 1 | Preparation Example 2 | Comparative Preparation Example 1 | Z/N catalyst | Comparative Preparation Example 3 | Comparative Preparation Example 4 |
| Pressure ($kg/cm^2$) | 35 | 35 | 35 | — | 35 | 35 |
| Propylene input amount (kg/h) | 40 | 40 | 40 | — | 40 | 40 |
| TEAL input amount (ppm) | 50 | 50 | 50 | — | 50 | 50 |
| Polymerization temperature | 70 | 70 | 70 | — | 70 | 70 |
| Hydrogen input amount (ppm) | 150 | 250 | 350 | — | 300 | 300 |
| activity (kg/g · cat) | 25 | 26 | 27 | — | 27 | 8 |

In the Table 1, 'homomPP' designates homopolypropylene resin, and 'Z/N homoPP' designates homopolypropylene resin (commercial product) prepared using a Ziegler-Natta catalyst. Further, in the Table 1, catalytic activity was calculated as the rate of the weight of produced polymer (kg PP) per gram (g) of used supported catalyst for unit hour (h). Particularly, in the case of Comparative Example 4, since catalytic polymerization activity was remarkably lowered to 8 kg/g·cat, it may be difficult to commercially apply or process trouble may be generated.

Comparative Example 5: Batch Type Homopolymerization of Propylene

Under the conditions described in the following Table 2, batch type homopolymerization was conducted to obtain homopolypropylene resins of Comparative Examples 5 to 7.

First, a 2 L stainless reactor was vacuum dried at 65° C. and cooled, 3 mL of triethylaluminum was put at room erization temperature was changed to 50° C., as shown in the following Table 2, thus obtaining homopolypropylene resin of Comparative Example 6.

Comparative Example 7: Batch Type Random Polymerization of Propylene

A polymerization process was conducted by the same method as Comparative Example 5, except that 20 g of ethylene was introduced together with 770 g of propylene to conduct random polymerization, as shown in the following Table 2, thus obtaining polypropylene homo/random blend of Comparative Example 7.

Comparative Example 8: Batch Type Homopolymerization of Propylene

A polymerization process was conducted by the same method as Comparative Example 5, except that the hydrogen gas input amount was changed to about 350 ppm, as shown in the following Table 2, thus obtaining homopolypropylene resin of Comparative Example 8.

TABLE 2

|  | Comparative Example 5 | Comparative Example 6 | Comparative Example 7 | Comparative Example 8 |
|---|---|---|---|---|
| Kind of polymer | Homo mPP | Homo mPP | Random mPP | Homo mPP |
| catalyst | Preparation Example 4 | Preparation Example 4 | Preparation Example 4 | Preparation Example 4 |
| Propylene input (g) | 770 | 770 | 770 | 770 |
| Ethylene input (g) | 0 | 0 | 20 | 0 |

TABLE 2-continued

|  | Comparative Example 5 | Comparative Example 6 | Comparative Example 7 | Comparative Example 8 |
|---|---|---|---|---|
| TEAL input (mL) | 3 | 3 | 3 | 3 |
| Polymerization temperature (° C.) | 70 | 50 | 70 | 70 |
| Hydrogen input (ppm) | 100 | 100 | 100 | 350 |

In the Table 2, 'homomPP' designates homopolypropylene resin, and 'random mPP' designates polypropylene homo/random blend in which propylene and ethylene are randomly copolymerized.

Property Evaluation of Polypropylene and Non-Woven Fabric Prepared Therefrom

Experimental Example 1: Property Evaluation of Polypropylene

For the polypropylene according to Examples and Comparative Examples, the properties were evaluated as follows, and the results were shown in the following Table 3.

(1) Melt Index (MI)

Melt index was measured at 230° C. under 2.16 kg load according to ASTM D 1238, and expressed as the mass (g) of polymer that is molten and flows out for 10 minutes.

(2) Tacticity (Mol %)

The tacticity (mol %) of polymer was measured through NMR (nuclear magnetic resonance) analysis.

Specifically, NMR spectrum was measured using a hexachlorobutadiene solution (based on tetramethylsilane), and tacticity (mol %) was calculated as a rate (%) of the area of the peaks appearing at 21.0 ppm to 21.9 ppm to the entire area (100%) of the peaks appearing at 19.5 ppm to 21.9 ppm.

(3) Melting Point (Tm)

The melting point (Tm) of polypropylene was measured using a Differential Scanning Calorimeter (DSC, device name: DSC 2920, manufacturing company: TA instrument). Specifically, polymer was heated to 220° C. and maintained at that temperature for 5 minutes, and then, the temperature was decreased to 20° C. and increased again, and the top of the DSC (Differential Scanning Calorimeter, manufactured by TA Instrument) curve was determined as a melting point. Here, the temperature increase and decrease rates were 10° C./min, and as the melting point, the measurement result in the second temperature increase section was used.

(4) Molecular Weight Distribution (MWD, Polydispersity Index)

Using GPC (gel permeation chromatography, manufactured by Water Company), the weight average molecular weight (Mw) and number average molecular weight (Mn) of the polymer were measured, and the weight average molecular weight was divided by the number average molecular weight to calculate molecular weight distribution (MWD).

Specifically, as gel permeation chromatography (GPC) device, Waters PL-GPC220 was used, and Polymer Laboratories PLgel MIX-B 300 mm length column was used. Here, the measurement temperature was 160° C., 1,2,4-trichlorobenzene was used as a solvent, and flow rate was set to 1 mL/min. Each polymer sample according to Examples and Comparative Examples was pretreated by dissolving in 1,2,4-trichlocobenzene containing 0.0125% BHT at 160° C. for 10 hours, and prepared at the concentration of 10 mg/10 mL, and then, fed in the amount of 200 μL, using GPC analysis equipment (PL-GP220). Mw and Mn were derived from a calibration curve formed using a polystyrene standard specimen. As the polystyrene standard specimen, 9 kinds having weight average molecular weight of 2000 g/mol, 10000 g/mol, 30000 g/mol, 70000 g/mol, 200000 g/mol, 700000 g/mol, 2000000 g/mol, 4000000 g/mol, 10000000 g/mol were used.

(5) Measurement of Residual Stress Rate

For the polypropylene according to Examples and Comparative Examples, each sample was taken, 200% strain was applied at 235° C., and then, change in residual stress was measured for 10 minutes.

For the measurement of residual stress, Discovery Hybrid Rheometer (DHR) from TA Instruments was used, and the sample was sufficiently loaded between the upper and lower plates having diameters of 25 mm and dissolved at 235° C., and then, a gap was fixed to 1 mm to measure.

Based on the measured residual stress data, residual stress rate (RS %) was calculated according to the following Calculation Formula 2, and shown in the following Table 3:

Residual stress rate$(Y)=(RS_1/RS_0)\times 100$    [Calculation Formula 2]

In the Calculation Formula 2, $RS_0$ is residual stress at 0.02 seconds ($t_0$) after applying 200% strain to the polypropylene resin sample, and $RS_1$ is residual stress at 1.00 second ($t_1$) after applying 200% strain to the polypropylene resin sample.

TABLE 3

|  | MI (g/10 min) | Tacticity (mol %) | Tm (° C.) | MWD | Residual stress rate (%) |
|---|---|---|---|---|---|
| Example 1 | 24 | 87 | 141 | 2.3 | 0.03 |
| Example 2 | 26 | 85 | 140 | 2.4 | 0.02 |
| Comparative Example 1 | 25 | 98 | 150 | 2.4 | 0.04 |
| Comparative Example 2 | 32 | 98 | 160 | 3 | 0.15 |
| Comparative Example 3 | 25 | 98 | 148 | 3.1 | 0.12 |
| Comparative Example 4 | 80 | 88 | 142 | 2.6 | 0.07 |
| Comparative Example 5 | 21 | 86 | 140 | 2.7 | 0.08 |
| Comparative Example 6 | 22 | 94 | 147 | 2.4 | 0.05 |
| Comparative Example 7 | 50 | 85 | 130 | 2.8 | 0.03 |
| Comparative Example 8 | 50 | 86 | 141 | 2.7 | 0.08 |

As shown in the Table 3, the homopolypropylene resins of Examples 1 and 2 have optimized melt index (MI) of 23 g/10 min to 26 g/10 min and tacticity of 85% to 87%, and simultaneously, have narrow molecular weight distribution (MWD) of 2.4 or less, low melting point (Tm) of 141° C. or less, and low residual stress rate of 0.03% or less. On the contrary, it can be seen that Comparative Examples 1 to 8 fail to simultaneously fulfill optimized ranges of tacticity, molecular weight distribution (MWD), melt index (MI), melting point (Tm) and residual stress rate. Particularly, it can be seen that in the case of Comparative Example 4, due to the low catalytic activity, melt index (MI) increases, molecular weight distribution increases to 2.6, and residual stress rate also increases to 0.07%.

Experimental Example 2

Using the polypropylene according to Examples and Comparative Examples as raw material, a melt blowing process was conducted to prepare spunbond non-woven fabric.

Specifically, using a 25 mm twin-screw extruder, a masterbatch of the polypropylene according to Examples 1 to 2 and Comparative Examples 1 to 8 and Exolit (trademakr) OP950 additive (2.5 wt %) was prepared, and then, it was pelletized. Subsequently, the masterbarch pellet was extruded into an ultrafine fiber web by a process similar to that described in Document [Report No. 4364 of the Naval Research Laboratories, published May 25, 1954 entitled "Manufacture of Superfine Organic Fibers" by Wente, Van. A. Boone, C. D., and Fluharty, E. L.], except that the molten masterbatch resin composition was fed to a melt pump (65 rpm), and then, fed to a melt blowing die of 25 cm width, having outlets (10 outlets/cm) and outlet diameter of 381 μm, using a 31 mm Brabender conical type twin screw extruder.

The melting temperature was 235° C., the screw speed was 120 rpm, the die was maintained at 235° C., primary air temperature and pressure were respectively 300° C. and 60 kPa (8.7 psi), polymer treatment speed was 5.44 kg/hr, and collector/die distance was 15.2 cm.

For the spunbond non-woven fabrics prepared using polypropylene resins according to Examples and Comparative Examples, the properties were evaluated as follows, and the results were shown in the following Table 4.

(1) Weight of Non-Woven Fabric

The weight of non-woven fabric that was prepared by extruding into an ultrafine fiber web according to Experimental Example 2 was measured, and the weight of non-woven fabric per unit area was calculated.

(2) Processability of Non-Woven Fabric

When preparing non-woven fabric according to Experimental Example 2, the processability of non-woven fabric was evaluated according to whether or not breakage was generated, and if breakage generation is 10% or less, it was marked as "good", and if breakage generation is greater than 10%, it was marked as "bad".

(3) Strength of Non-Woven Fabric

The strength of non-woven fabric was measured by 5 cm width cut strip method according to ASTM D 5035:2011 (2015).

(4) Frictional Coefficient of Non-Woven Fabric

The frictional coefficient of non-woven fabric was measured using a frictional coefficient measuring device (manufacturing company: Thwing-Albert Company, product name: FP-2260).

(5) Tactility of Non-Woven Fabric

The tactility of non-woven fabric was measured through the evaluation of 10 blind panels, and if 7 or more persons evaluate the non-woven fabric as being soft, it was judged as good and marked as "○", and if 4 to 6 persons evaluate so, judged as normal and marked as "Δ", and if 3 or less persons evaluate so, judged as bad and marked as "X".

TABLE 4

| | Composition of resin | Weight of non-woven fabric (g/m$^2$) | Processability | Strength | Frictional coefficient | Tactility |
|---|---|---|---|---|---|---|
| Example 1 | Homo | 12 | Good | 36/18 | 0.25 | ○ |
| Example 2 | Homo | 12 | Good | 35/18 | 0.23 | ○ |
| Comparative Example 1 | Homo | 12 | Good | 37/18 | 0.35 | Δ |
| Comparative Example 2 | Homo | 15 | Bad | 24/11 | Not measurable | Δ |
| Comparative Example 3 | Homo | 15 | Bad | 23/11 | 0.48 | Δ |
| Comparative Example 4 | | Not preparable | Not preparable | Not preparable | Not preparable | Not preparable |
| Comparative Example 5 | Homo | 15 | Bad | 25/12 | 0.31 | X |
| Comparative Example 6 | Homo | 15 | Bad | 25/11 | 0.35 | X |
| Comparative Example 7 | Homo/Random | 18 | Bad | 18/10 | 0.3 | Δ |
| Comparative Example 8 | Homo | 15 | Bad | 23/12 | 0.28 | X |

As shown in the Table 4, the homopolypropylene resins of Examples 1 and 2 with optimized tacticity, molecular weight distribution (MWD), melt index (MI), melting point (Tm), and residual stress rate do not generate breakage during a melt blowing process using it as raw material, thus enabling a continuous process, and decrease modulus, thus preparing non-woven fabric softer than the existing products.

Meanwhile, it was confirmed that the polypropylene resins of Comparative Examples 1 to 8 in which tacticity, molecular weight distribution (MWD), melt index (MI), melting point (Tm), and residual stress rate do not fall within the optimized ranges, generate breakage during a melt blowing process using it as raw material, and thus, continuous process cannot be conducted, and due to wide molecular weight distribution, strength is lowered, or due to high tacticity, frictional coefficient or tactility of prepared non-woven fabric is lowered.

Particularly, it was confirmed that in Comparative Example 1, melting point increases, and frictional coefficient or tactility of prepared non-woven fabric is lowered. It was confirmed that in Comparative Examples 2 and 3, due to wide molecular weight distribution of 3 or more, processability is lowered when preparing non-woven fabric, and the entire uniformity of non-woven fabric is lowered (partially sparse and dense parts exist), and thus, strength, frictional coefficient, and tactility are lowered. In Comparative Example 4, since the resin has high melt index (MI), non-woven fabric could not be produced (not prepared), and thus, the properties of non-woven fabric could not be measured.

Further, in Comparative Example 5, due to wide molecular weight distribution (>2.4), processability is bad, and thus, the entire uniformity of non-woven fabric decreases (partially sparse or dense parts exist), thus lowering strength, frictional coefficient, and tactility. It was confirmed that in Comparative Example 6, even if the same catalyst is used, since resin preparation condition is 50° C. which is lower than the temperature range (70° C.) that can be generally used commercially or in laboratories, tacticity increases, thus lowering frictional coefficient or tactility of prepared non-woven fabric. It was confirmed that the kind of the resin of Comparative Example 7 is not homo but random resin, thus rapidly deteriorating strength, particularly. It was also confirmed that the resin of Comparative Example 8 has high flowability with melt index (MI) of 50 g/10 min, due to high hydrogen input, and thus, there are problems in terms of breakage during processing of non-woven fabric as well as strength, and normal non-woven fabric cannot be prepared.

The invention claimed is:

1. A homopolypropylene resin for non-woven fabric, wherein the homopolypropylene resin has tacticity of 80% to 90%, molecular weight distribution of 2.4 or less, melt index of 20 g/10 min to 30 g/10 min, melting point of 145° C. or less, and residual stress rate of 0.05% or less.

2. The homopolypropylene resin according to claim 1, wherein the homopolypropylene resin has molecular weight distribution of 2.1 to 2.4.

3. The homopolypropylene resin according to claim 1, wherein the homopolypropylene resin has melting point of 133° C. to 143° C.

4. The homopolypropylene resin according to claim 1, wherein the homopolypropylene resin has tacticity of 82% to 87%.

5. The homopolypropylene resin according to claim 1, wherein the homopolypropylene resin has melt index of 23 g/10 min to 26 g/10 min.

6. The homopolypropylene resin according to claim 1, wherein the homopolypropylene resin has residual stress rate of 0.006% to 0.03%.

7. A method for preparing the homopolypropylene resin according to claim 1, comprising a step of polymerizing propylene in the presence of a single catalyst comprising only a transition metal compound represented by the following Chemical Formula 1 as a catalytically active component:

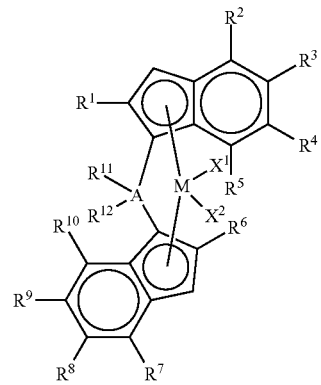

[Chemical Formula 1]

in the Chemical Formula 1,

A is carbon, silicon or germanium,

M is Group 4 transition metal;

$X^1$ and $X^2$ are identical to or different from each other, and are each independently, halogen, substituted or unsubstituted $C_{1-20}$ alkyl, substituted or unsubstituted $C_{2-20}$ alkenyl, substituted or unsubstituted $C_{6-20}$ aryl, nitro, amido, substituted or unsubstituted $C_{1-20}$ alkylamino, substituted or unsubstituted $C_{6-20}$ arylamino, substituted or unsubstituted $C_{1-20}$ alkylsilyl, substituted or unsubstituted $C_{1-20}$ alkoxy, or substituted or unsubstituted $C_{1-20}$ sulfonate;

$R^1$ and $R^6$ are identical to or different from each other, and are each independently, hydrogen, or substituted or unsubstituted $C_{1-20}$ alkyl;

$R^2$ and $R^3$, and $R^7$ and $R^8$ are respectively connected with each other to form a substituted or unsubstituted $C_{6-20}$ aliphatic or aromatic ring;

$R^4$, $R^5$, $R^9$, and $R^{10}$ are identical to or different from each other, and are each independently, hydrogen, halogen, substituted or unsubstituted $C_{1-20}$ alkyl, substituted or unsubstituted $C_{2-20}$ alkenyl, substituted or unsubstituted $C_{1-20}$ alkylsilyl, substituted or unsubstituted $C_{1-20}$ silylalkyl, substituted or unsubstituted $C_{1-20}$ alkoxysilyl, substituted or unsubstituted $C_{1-20}$ ether, substituted or unsubstituted $C_{1-20}$ silylether, substituted or unsubstituted $C_{1-20}$ alkoxy, substituted or unsubstituted $C_{6-20}$ aryl, substituted or unsubstituted $C_{7-20}$ alkylaryl, or substituted or unsubstituted $C_{7-20}$ arylalkyl; and $R^{11}$ and $R^{12}$ are identical to each other, and are $C_{2-20}$ alkyl.

8. The method for preparing homopolypropylene resin for non-woven fabric according to claim 7, wherein $R^2$ and $R^3$, and $R^7$ and $R^8$ are respectively connected with each other to form $C_{6-20}$ aryl.

9. The method for preparing homopolypropylene resin for non-woven fabric according to claim 7, wherein the transition metal compound is represented by the following Chemical Formula 1-17:

[Chemical Formula 1-1]

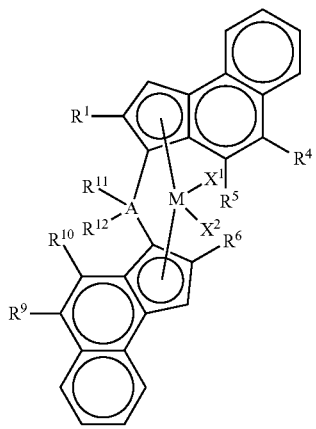

in the Chemical Formula 1-1,
A, M, $X^1$, $X^2$, $R^1$, $R^4$, $R^5$, $R^6$, $R^9$, $R^{10}$, $R^{11}$, and $R^{12}$ are the same as defined above.

10. The method for preparing homopolypropylene resin for non-woven fabric according to claim 7, wherein A is silicon, and M is zirconium or hafnium.

11. The method for preparing homopolypropylene resin for non-woven fabric according to claim 7, wherein $X^1$ and $X^2$ are each independently, halogen.

12. The method for preparing homopolypropylene resin for non-woven fabric according to claim 7, wherein $R^1$ and $R^6$ are each independently, hydrogen, or $C_{1-5}$ linear alkyl.

13. The method for preparing homopolypropylene resin for non-woven fabric according to claim 7, wherein $R^4$, $R^5$, $R^9$, and $R^{10}$ are hydrogen.

14. The method for preparing homopolypropylene resin for non-woven fabric according to claim 7, wherein $R^{11}$ and $R^{12}$ are identical to each other, and are $C_{2-4}$ linear alkyl.

15. The method for preparing homopolypropylene resin for non-woven fabric according to claim 7, wherein the transition metal compound is represented by one of the following Structural Formulas:

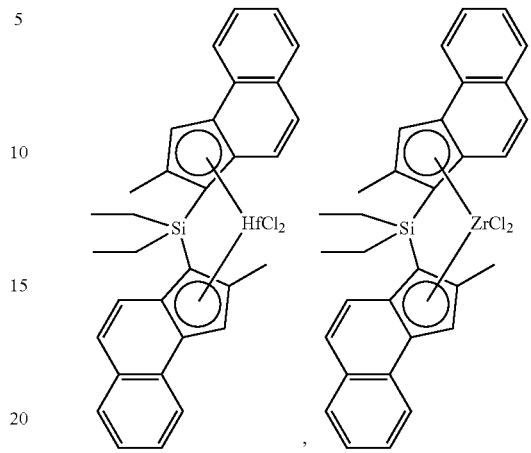

16. The method for preparing homopolypropylene resin for non-woven fabric according to claim 7, wherein the polymerization step is conducted by continuous bulk-slurry polymerization process.

17. The method for preparing homopolypropylene resin for non-woven fabric according to claim 7, wherein A is silicon; M is Zr or Hf; each of $X^1$ and $X^2$ is halogen; each of $R^1$ and $R^6$ is hydrogen or methyl; $R^2$ and $R^3$, and $R^7$ and $R^8$ are respectively connected with each other to form $C_{6-20}$ aryl; $R^4$, $R^5$, $R^9$, and $R^{10}$ are hydrogen; $R^{11}$ and $R^{12}$ are identical to each other, and $C_{2-4}$ linear alkyl group.

18. The method for preparing homopolypropylene resin for non-woven fabric according to claim 7, wherein the step of polymerizing propylene is conducted under hydrogen gas.

* * * * *